Figure 3:
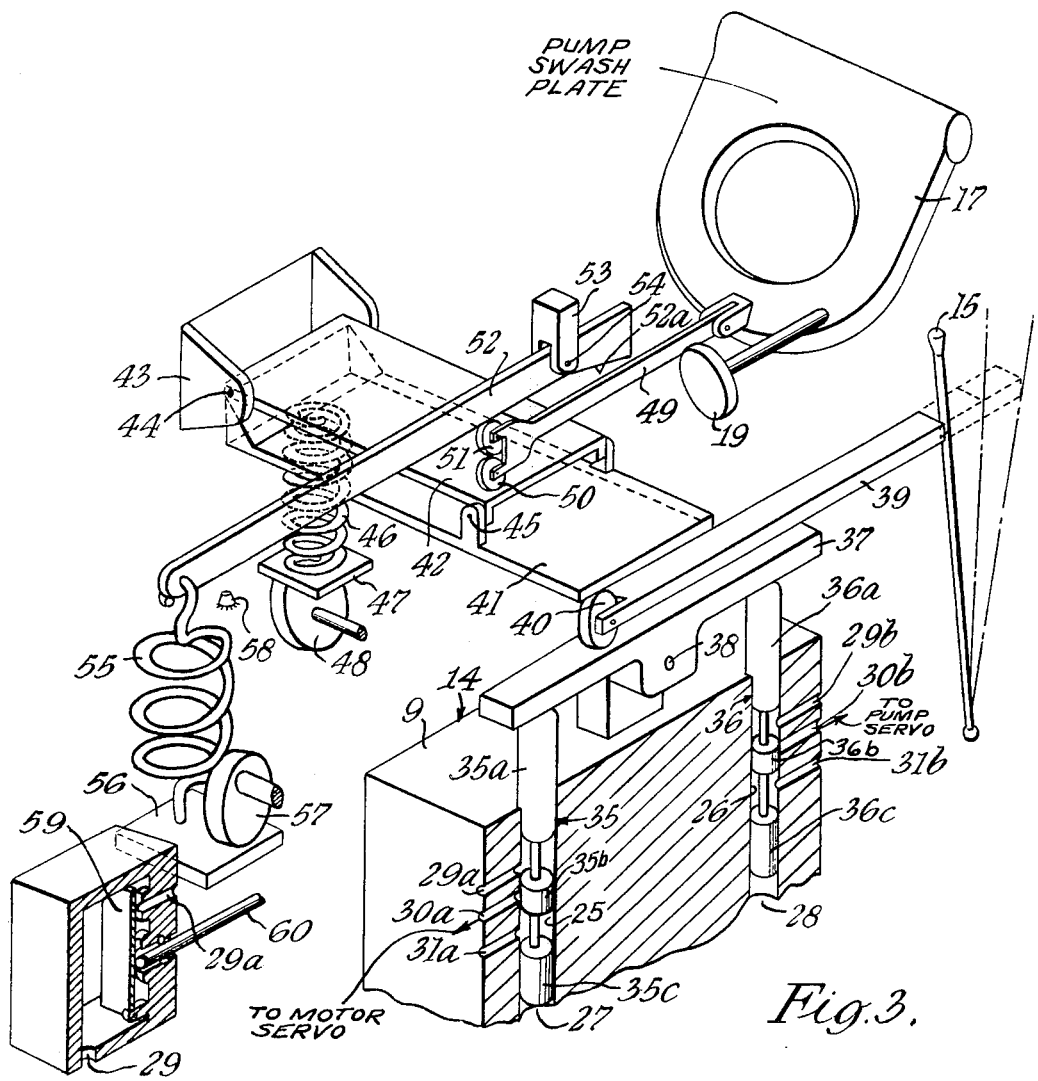

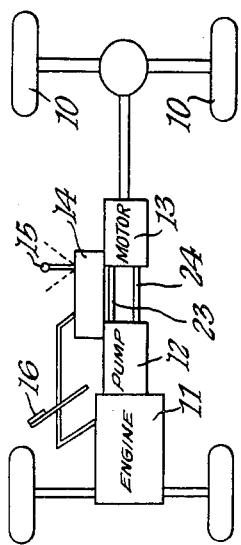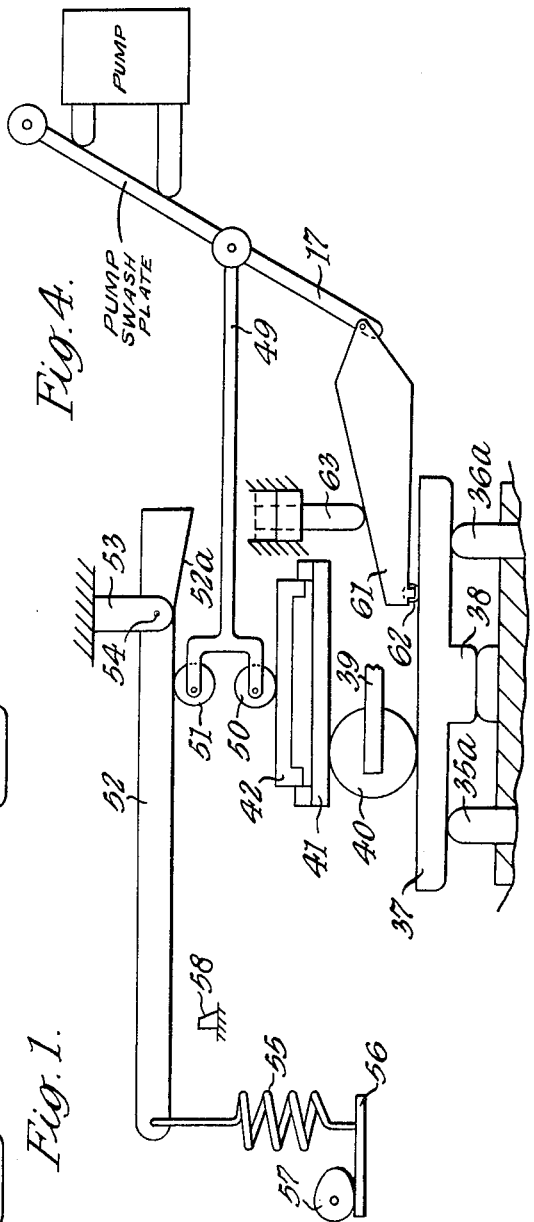

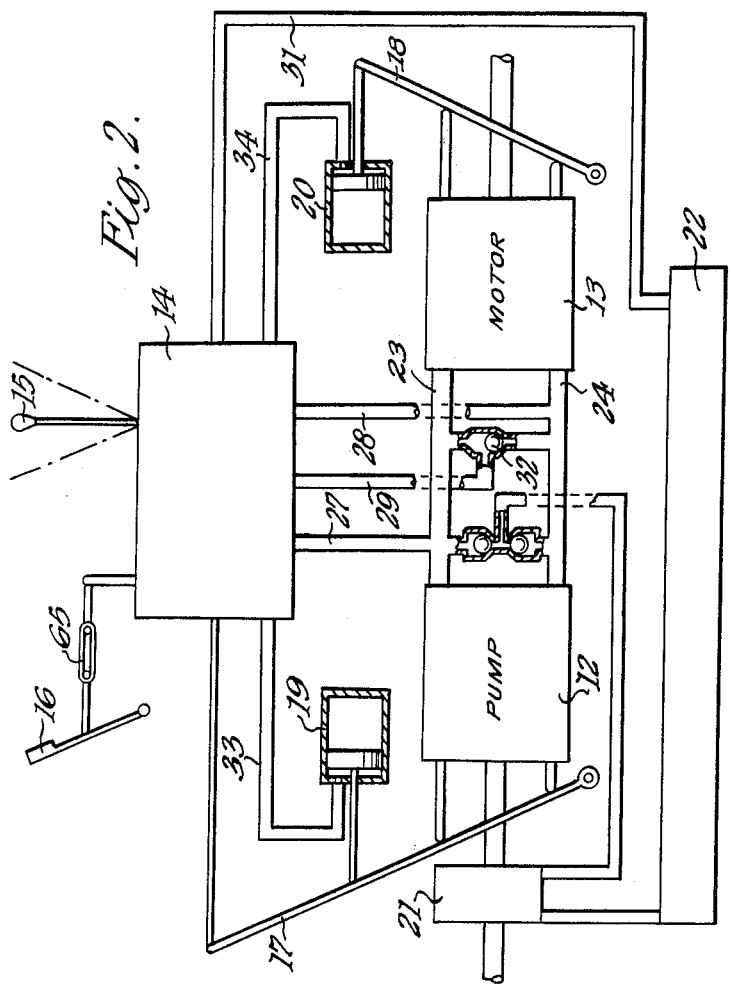

United States Patent Office 3,228,184
Patented Jan. 11, 1966

3,228,184
HYDRAULIC TRANSMISSION SYSTEMS
John Harbidge and John Kirkland Todd, Birmingham, England, assignors to Joseph Lucas (Industries) Limited, Birmingham, England
Filed Aug. 28, 1964, Ser. No. 392,725
6 Claims. (Cl. 60—19)

This invention relates to hydraulic transmission systems, particularly but not exclusively for road vehicles, and has for its object to provide such a system in a convenient form.

A system according to the invention comprises in combination an engine-driven variable capacity pump, a motor driven by said pump, control means for varying the capacity of the pump with the load on the engine in a manner to maintain a constant torque on the engine, and mechanical means for modifying the action of the control means when the pump capacity is below a predetermined value in order to prevent the pressures developed in the pump from rising to undesirably high values.

One example will now be described with reference to the accompanying drawings in which:

FIGURE 1 is a diagrammatic representation of a vehicle incorporating the present invention, FIGURE 2 is a diagrammatic representation of the transmission system as applied to the vehicle in FIGURE 1, FIGURE 3 is a perspective view of the control means for this transmission system, and FIGURE 4 is a fragmentary view showing a further mechanism forming part of the control means.

FIGURE 1 shows a vehicle having a pair of driven wheels 10, an engine 11 for driving the wheels through a pump 12 and a motor 13, there being a control means indicated at 14 for varying the strokes of the pump and motor, these being of the swash-plate type. The control means 14 is driver operable through the lever 15 and by the pedal 16.

In FIGURE 2 the swash plates of the pump and motor are indicated at 17 and 18 respectively and servo mechanisms for varying the strokes are indicated at 19 and 20 respectively.

There is also provided an engine-driven boost pump 21 which supplies hydraulic fluid from a reservoir 22 to the pump 12. The pump 12 supplies fluid to drive the motor 13, through passages 23, 24.

The control means 14 comprises a body 9 having formed therein first and second parallel cylinders 25, 26 as seen in FIGURE 3 which, in order to facilitate description, will be considered to extend vertically. The lower ends of the first and second cylinders are connected to high and low pressure sources derived from the passages 23, 24 respectively as indicated at 27 and 28. Moreover, each cylinder has communicating therewith three ports 29a, 30a, 31a, and 29b, 30b, 31b respectively which enter the cylinder at axially spaced positions. The upper ports 29a, and 29b are subjected to a selected pressure source which at all times is the higher of the pressures in the passages 23, 24 between the pump and motor, this selection being by means of the valve 32 in the passage 29. The lower ports 31a and 31b are connected to drain through the passage 31 in FIGURE 2, and the intermediate ports 30a, and 30b entering the first and second cylinders 25, 26 are connected respectively to the servo-mechanisms 20, 19 for varying the swash plate angles of the motor and pump, through the passages 34 and 33, respectively.

Within the cylinders 25 and 26 respectively are first and second spools 35, 36 each comprising an upper land 35a, 36a, an intermediate land 35b, 36b, and a lower land 35c, 36c. The upper lands extend from the body 9 and bear against the lower face of a first lever 37 which is mounted on the body for angular movement about a horizontal axis indicated at 38, equidistant from the axes of the cylinders 25, 26.

There is further provided a second lever 39 which extends parallel to the first lever 37 and to one end of which is secured a roller 40 which rolls on the upper face of the first lever 37. The second lever 39 is axially movable by the manual lever 15 of the vehicle between a neutral position in which the roller 40 is vertically above the axis 38 of the first lever 37, and forward and reverse positions in which the roller is nearer the first and second cylinders 25, 26 respectively.

Resting on the roller 40 is one end of a first plate 41 which extends in a generally horizontal direction at right angles to the first and second levers 37, 39. Intermediate its ends, the plate is pivotally connected to a second plate 42 the other end of which is pivotally connected to a fixed part 43 so that the second plate 42 is angularly movable about a horizontal axis 44 parallel to the first and second levers. The axis of the pivotal connection between the first and second plates is indicated at 45. The plates 41, 42 are normally urged into contact with one another by a compression spring 46 which acts between the end of the first plate 41 remote from the roller 40 and a member 47 the position of which is controlled by a first cam 48 movable angularly by the throttle pedal 16 of the vehicle.

Pivotally secured to the swash plate of the pump 17 is one end of a third lever 49 which extends parallel to the first and second levers 37, 39, and at its other end is bifurcated and supports second and third rollers 50, 51. The second roller 50 rolls on the upper surface of the second plate 42 whilst the third roller rolls on the under surface of a fourth lever 52 which at one end is mounted on a fixed part 53 for angular movement about an axis 54 parallel to the axis 38 about which the first lever moves. The other end of the fourth lever 52 is connected to one end of a tension spring 55 the other end of which is connected to a member 56, the position of which is controlled by a second cam 57 movable angularly by the throttle pedal 16.

The tension spring 55 exerts a downward moment on the plates 41, 42 through the fourth lever 52 and the second and third rollers 50, 51, the value of this moment being determined in part by the setting of the cam 57 and in part by the positions of the second and third rollers 50, 51. The plates 41, 42 are urged upwardly by the upper land of the spool 35 in the first cylinder 25 through the first lever 37 and first roller 40, and in equilibrium, these forces acting on the plates 41, 42 balance. Meanwhile the compression spring 46 plays no part in the operation except to urge the plates 41, 42 into contact so that they act effectively as a single plate.

Assuming that the second lever 39 is moved to its forward position as shown in FIGURE 3, the first lever 37 will move in an anti-clockwise direction to move the spool 35 downwards and the spool 36 upwards. The passage 30b will thus be in communication with the passage 31b, so that the pump servo 19 will be allowed to drain through passage 33, thus moving the pump swash plate 17 towards a full stroke position. Movement of the pump swash plate alters the leverage of the spring 55, and increasing pressure in the system with increasing pump stroke, will have the effect of exerting a force on the spool 35 which will, when an equilibrium condition is reached, balance the spring force. In this equilibrium position, the pump servo connection 30b is isolated from the passage 31b to drain.

If equilibrium is broken by a change in throttle pedal setting or by a change in the load on the engine, the intermediate lands 35b and 36b will be moved to vary the settings of the swash plates 17, 18 until the second and third rollers 50, 51 assume positions in which equilibrium is restored.

The arrangement thus far described will maintain the torque developed by the engine substantially constant for any throttle setting. However, for low values of swash plate angle (e.g. below 4°), the system would tend to raise the operating pressures of the pump and motor to unacceptable high values. For this reason the pair of plates 41, 42 and compression spring 46 are employed, and the arrangement is such that below the predetermined pump swash plate angle, the compression spring 46 is not strong enough to maintain the plates 41, 42 in contact. The first plate 41 now moves angularly about pivotal axis 45 with respect to the second plate so that further operation of the system is controlled by both the tension spring 55 and the compression spring 46.

When the second lever 39 is moved to its neutral position, the plates 41, 42 and associated mechanisms have no effect on the operation. The servo-mechanisms 19, 20 are not in this case connected either to drain or to a pressure source, and the swash plates assume their neutral positions.

With the second lever 39 in its reverse position (that is, moved to the right, as seen in FIGURE 3), the swash plate 17 of the pump 12 is moved past the position of zero stroke. When the swash plate 17 reaches this zero stroke position, the rollers 50, 51 on the third lever 49 and also the roller 40 on the lever 39 will be immediately over the position of the axis 38. Since the pivot axis 54 of the lever 52 is also aligned with the rollers 50, 51 and 40 and axis 38, the lever 52 will pivot about its axis 54 under the influence of the spring 55, until the stop 58 is reached. This will bring the portion 52a of the underside of the lever 52 into a horizontal position.

Further movement of the lever 15 to select reverse drive, will cause the pump servo 19 to be subjected to pressure to move the swash plate beyond the zero stroke position thus moving the plates 41, 42 downwards, this movement being resisted by the spring 46. The roller 51 will be moved along the portion 52a of the lever 52 until an equilibrium position is reached, in a similar manner to that previously described.

It has been stated above that the pump and motor swash plates are adjusted simultaneously. However, it is preferred that no adjustment is made to the motor until the pump is operating at maximum stroke. In order to accomplish this, the selected high pressure supply to the first cylinder 25 is fed through a valve 59 which is arranged to be opened, by a plunger 60 arranged to contact the pump swash plate, only when the pump is operating at maximum stroke.

The system also preferably includes means which when actuated prevents the pump stroke from being increased above a predetermined value. This means is intended for use to provide engine braking when required, or for use in traffic, and is shown in FIGURE 4. The means comprises a cam 61 which at one end is pivotally connected to the swash plate 17 of the pump, and at its other end carries a roller 62 which rolls on the first lever 37 at the same end as the second cylinder 26. The roller 62 normally rolls freely on the first lever 37 so that the cam 61 has no effect on the operation.

However, when it is desired to actuate the means, a stop 63 is introduced into the path of movement of the cam 61. When the cam 61 contacts the stop 63, the roller 62 will exert a force downwardly on the lever 37. Further movement of the cam 61 will cause pivotal movement of the lever 37, thus displacing the spool 36 downwardly to admit high pressure from the passage 29b to the passage 30b to the pump servo 19, to reduce the pump stroke. This will have the effect of moving the cam 61 to the right, as seen in FIGURE 4, until the lever 37 returns to the horizontal position, and equilibrium is restored. It will be appreciated that for strokes below the selected limit, the operation of the system described above remains unaffected.

For each value of throttle seting below the given value, the position of the driver's throttle may be overridden to prevent excessive engine speeds being selected. This is most easily achieved by incorporating a lost motion devic 65 (see FIGURE 2) in the throttle control linkage, whereby the throttle valve of the engine is prevented from assuming a position corresponding to that selected by the driver until the pump stroke has increased to a value allowing the power developed by the engine to be absorbed.

Having thus described our invention what we claim as new and desire to secure by Letters Patent is:

1. An hydraulic transmission system comprising an engine, a variable capacity pump driven by the engine, a motor driven by the pump, a spool, a first manually operable member, a pressure responsive device, the spool being responsive to movement of the first manually operable member to control the flow of fluid in the pressure responsive device, the pressure responsive device being arranged to vary the capacity of the pump, a plate-like member responsive to spool movement, spring means also acting upon said plate-like member with a force dependent upon a lever mechanism, the position of which is dependent upon the capacity of the pump, a further manually operable member movement of which varies the force of said spring means, said further manually operable member also being arranged to control the engine speed, said plate-like member being capable of taking up an equilibrium position for any setting of the further manually operable member, and means for modifying the action of the spring means and of the lever mechanism on the plate-like member when the pump capacity is below a predetermined value.

2. An hydraulic transmission system according to claim 1 in which said means for modifying the action of the plate-like member comprises biasing means permitting relative movement between two parts of said plate-like member when said pump capacity is below said predetermined value.

3. An hydraulic transmission system according to claim 2 in which the force exerted by said biasing means is variable in response to movement of said further manually operable member.

4. An hydraulic transmission system comprising an engine, a variable capacity pump driven by the engine, a motor driven by the pump, a spool, a first manually operable member, a pressure responsive device, the spool being responsive to movement of the first manually operable member to control the flow of fluid in the pressure responsive device, the pressure responsive device being arranged to vary the capacity of the pump, a plate-like member responsive to spool movement, spring means also acting upon said plate-like member with a force dependent upon a lever mechanism, the position of which is dependent upon the capacity of the pump, a further manually operable member movement of which varies the force of said spring means, said further manually operable member also being arranged to control the engine speed, said plate-like member being capable of taking up an equilibrium position for any setting of the further manually operable member, and means for modifying the action of the spring means and of the lever mechanism on the plate-like member when the pump capacity is below a predetermined value, there being means whereby the motor capacity can also be varied.

5. An hydraulic transmission system comprising an engine, a variable capacity pump driven by the engine, a motor driven by the pump, a spool, a first manually operable member, a pressure responsive device, the spool being responsive to movement of the first manually operable member to control the flow of fluid in the pressure responsive device, the pressure responsive device being arranged to vary the capacity of the pump, a plate-like member responsive to spool movement, spring means also acting upon said plate-like member with a force dependent upon a lever mechanism, the position of which is dependent upon the capacity of the pump, a further manually operable member movement of which varies the force of said spring means, said further manually operable member also being arranged to control the engine speed, said plate-like member being capable of taking up an equilibrium position for any setting of the further manually operable member, and means for modifying the action of the spring means and of the lever mechanism on the plate-like member when the pump capacity is below a predetermined value and there being a selectively operable device for establishing a predetermined maximum value for the pump capacity.

6. An hydraulic transmission system according to claim 5 in which said selectively operable device comprises an adjustable stop member, a cam engageable by the stop member, said cam being movable in response to changes in pump capacity and also being responsive to spool movement, means being provided whereby the stop can prevent the establishment of an equilibrium position of the plate-like member when the pump capacity is above said predetermined maximum value.

References Cited by the Examiner
UNITED STATES PATENTS

| | | | |
|---|---|---|---|
| 3,003,309 | 10/1961 | Bowers et al. | 60—19 |
| 3,017,750 | 1/1962 | Kempson | 60—52 |
| 3,053,043 | 9/1962 | Knowler | 60—52 X |

EDGAR W. GEOGHEGAN, *Primary Examiner.*